May 1, 1928.                1,668,453
C. H. GRAESSER ET AL
VALVE
Filed May 4, 1927           2 Sheets-Sheet 1

Carl H. Graesser
Ernest B. Crocker
Inventors by Roberts Cushman Woodberry
Attorneys

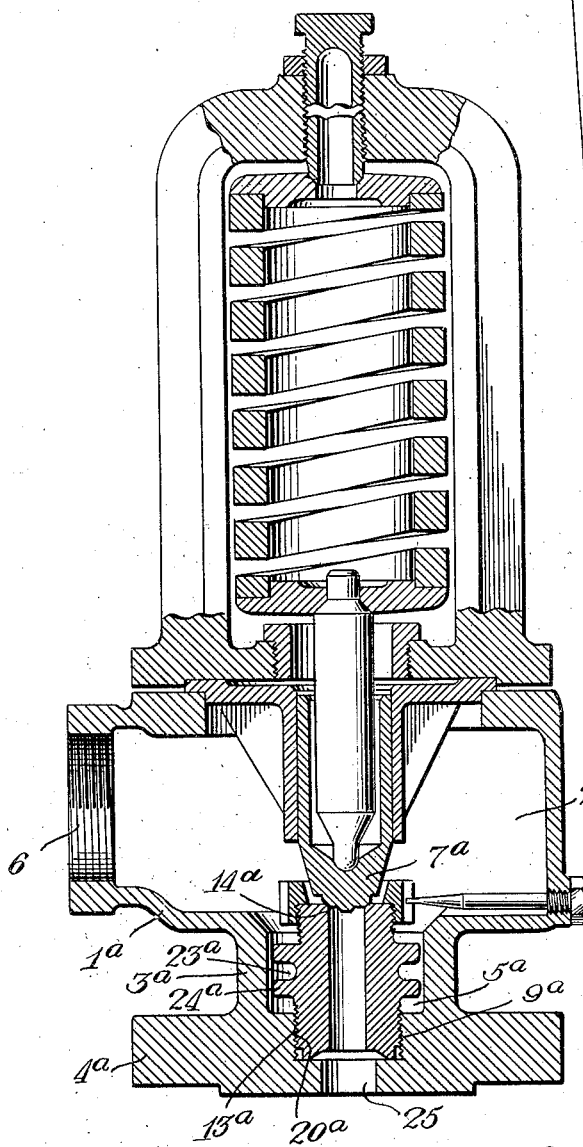
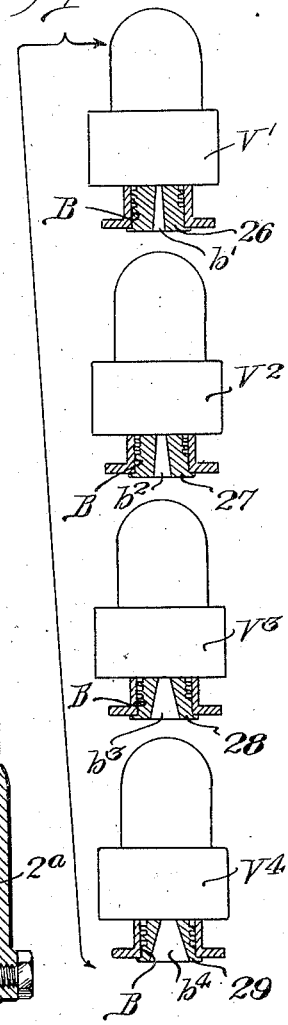

Patented May 1, 1928

1,668,453

UNITED STATES PATENT OFFICE.

CARL H. GRAESSER, OF BRIDGEPORT, AND ERNEST B. CROCKER, OF STRATFORD, CONNECTICUT, ASSIGNORS, BY MESNE ASSIGNMENTS, TO CONSOLIDATED ASHCROFT HANCOCK COMPANY, OF NEW YORK, N. Y., A CORPORATION OF DELAWARE.

VALVE.

Application filed May 4, 1927. Serial No. 188,721.

This invention pertains to safety valves such as are used on steam boilers, oil stills and other containers for fluid under pressure, the present construction constituting an improvement upon that disclosed in the patent to Blanchard and Crocker No. 1,143,027 dated June 15, 1915. The patent just referred to describes some of the things which tend to throw the seat of an ordinary valve out of true and discloses an improved construction designed to prevent such undesirable occurrence. At pressures and temperatures such as were commonly met with in practice at the time of issue of said patent, the patented construction was all that could be desired and the patented features have probably contributed very largely to the commercial success of a well-known make of valve. However, recent developments in steam engineering practice, as well as new discoveries in the petroleum and other chemical industries, demand fluid pressures and temperatures not previously regarded as desirable or practical. Such high pressures require extremely heavy pipes and fittings while the high temperatures encountered have a very pronounced expansive effect upon these heavy metal parts. Under such circumstances, the arrangement disclosed in the above patent, while still far superior to ordinary constructions, is not always adequate fully to counteract the distortion effects in the valve casing, so that under unusual and extreme conditions of heat and pressure some slight displacement of the valve seat is at times found to occur.

Careful investigation has convinced us that this occasional failure of the patented construction to compensate for distortions of the valve casing is due in part at least to the location of the seat bushing in the casing. As ordinarily constructed a safety valve comprises a base or attaching flange of large diameter having openings for the reception of studs or bolts by means of which it is attached to the wall of the pressure receptacle. The valve structure usually comprises a relatively slender stem rising from its flange and carrying the body of the casing in which the valve proper and its seat are located. In the patented construction the seat bushing is secured to the valve casing just at the junction of the stem portion of the casing with the body portion, and under ordinary conditions the bushing is well adapted to compensate and correct minor distortions of the casing. However, the point of attachment of the bushing to the casing as disclosed in the patent is not the best, for immediately below said point of attachment the body portion of the casing is unsymmetrical, comprising thick and thin sections which do not move to the same extent when subjected to heat and pressure, thus to some degree distorting the casing and causing the bushing to tilt as a whole. In the ordinary valve this distortion is minute and is readily compensated for by the bushing, but in the large and heavy valves employed for modern high pressure work and at the high temperatures encountered, the distortion of the unsymmetrical valve body becomes pronounced so that the compensating power of the bushing is sometimes exceeded.

To avoid overtaxing the capacity of the bushing when the valve is subjected to extremely high temperatures and pressures or is of unusually large capacity we have so enlarged the diameter of the stem of the valve casing as to provide a chamber therein capable of receiving the entire seat bushing or at least the major portion thereof, thus lowering the valve seat to a point closely adjacent to the junction of the stem with the body of the casing (which has as a secondary advantage the lowering of the outlet connection thus giving the weight of the outlet pipe less leverage to deflect the valve casing and at the same time substantially decreasing the vertical dimensions of the entire valve) and we attach the bushing to the casing at a point closely adjacent to the flange and preferably within the thickness of the latter. Since at this point the casing is substantially symmetrical, the attaching flange usually constituting a complete annulus of heavy uniform section, there is seldom any appreciable distortion at this part of the casing, and when the bushing is attached at this point we find that it supports the valve seat in true position even when the casing is subjected to the extreme pressure and temperature conditions met with in modern practice.

While no difficulty has ever been experienced, so far as we are aware, with leakage of steam past the screw-threaded connection between the seat bushing and casing of the patented construction, we prefer in our new arrangement, although not necessarily bound to do so, as will hereinafter appear, so as to associate the seat bushing with the casing as to relieve the screw-threaded connection of the full steam pressure, thus effectively ensuring against leakage or the remote possibility of stripping the threads under destructive pressures.

In the embodiments of the invention herein disclosed we prefer to form the valve seat surface directly upon the seat bushing rather than on an independent ring as is disclosed in the patented construction, since the elimination of this ring simplifies and cheapens the device and is made wholly practical by the employment of a suitable material in making the bushing. However, while this simplified construction just described is preferred, it is not essential to the broader aspects of the invention.

The novel construction herein described has been found very advantageous in the production of a standardized line of valves all having the same or substantially the same outside dimensions and delivery capacities but adapted for use with pressures of widely different ranges. Thus for example one valve of a set may be adjustable to pressures from zero to 200 pounds, the next valve for pressures ranging from 200 to 400 pounds, the next from pressures ranging between 400 and 900, and the next between pressures ranging from 900 to 1500, etc. With the herein described arrangement it is simply necessary to vary the bore in the valve seat bushing in inverse ratio to the steam or other fluid pressure, the chamber in the steam of the valve casing being of sufficient diameter to receive a bushing having a bore of the largest size. It is thus possible, by making the bushings of a uniform outside diameter, to make them interchangeable with any valve casing, so that but a single sized casing is necessary to care for all pressures and any casing may be converted for use with a selected new pressure range merely by changing its valve seat bushing.

In some instances, particularly for use upon oil stills, valve users prefer forgings instead of castings, and we find that the arrangement herein disclosed lends itself to this method of production more readily than does the patented construction by reason of the modified shape of the parts.

In the accompanying drawings we have disclosed by way of example certain desirable embodiments of the invention and in the drawings:

Fig. 2 is a vertical section illustrating a modified arrangement; and

Fig. 3 is a diagrammatic view illustrating the application of the present invention to a standardized line of valves.

Figure 1:
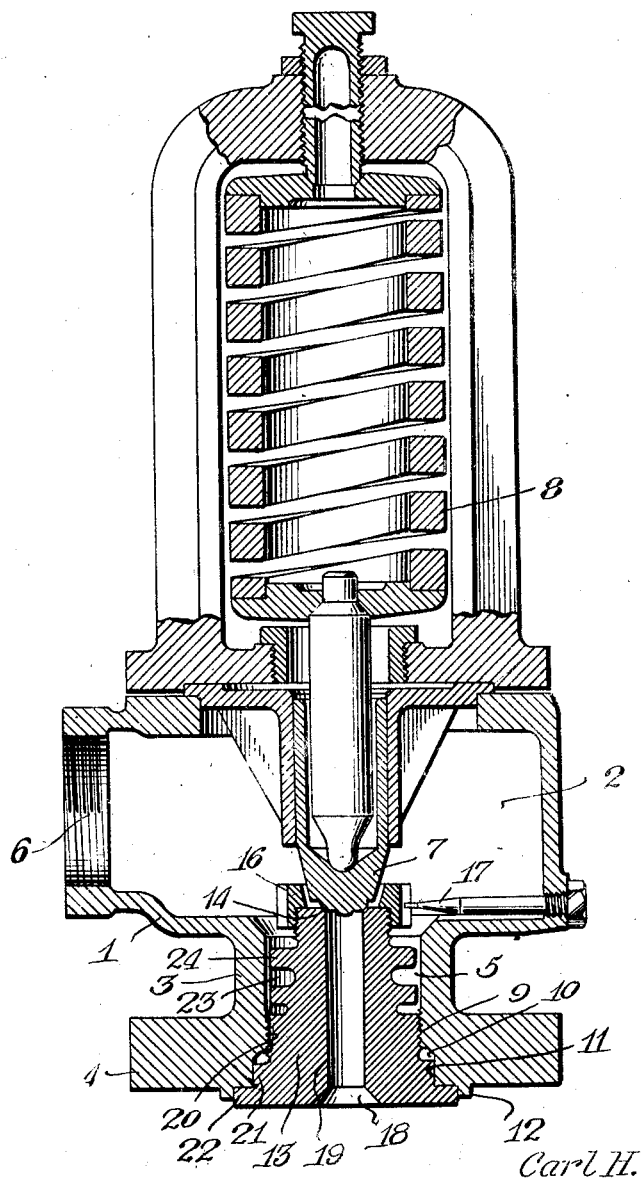
Fig. 1 is a vertical section through a safety valve of preferred form.

Referring to Fig. 1, the numeral 1 designates the body of the valve casing. The body of the casing has a chamber 2 therein and is supported upon a stem 3 having an attaching flange 4 at its lower end. The stem is furnished with an inlet bore or passage 5 leading from the lower end of the flange 4 upwardly into the chamber 2, the latter having an outlet 6, here shown as internally screw threaded for the reception of a pipe connection. A valve 7 of any usual construction is ranged within the chamber 2 and is normally held against its seat by a spring 8. Since the specific construction and arrangement of the valve and its spring, together with the intermediate connections, form no part of the present invention further description thereof is unnecessary herein.

The inner surface of the bore 5 in the casing is screw threaded at 9, preferably at a point within the thickness of the attaching flange 4. Below this threaded portion the bore 5 is enlarged, as indicated at 10, to provide a rabbet or annular recess having a circumferential wall 11. Preferably the lower surface of the flange 4 is provided with a downwardly directed annular rib or flange 12 concentric with the bore 5. A seat bushing 13 is disposed within the chamber or bore 5 in the casing and an annular valve seat 14 is preferably formed directly upon the upper end of this bushing 13, although so far as the broader aspects of the invention are concerned, it is immaterial whether this valve seat be formed directly upon the bushing itself or upon a ring or other suitable member carried by the bushing.

Preferably the outer surface of the bushing, at its upper end, is screw threaded for the reception of the blow down ring 16 which may be of usual character and which is locked in adjusted position by means of the usual stop pin 17.

The bushing 13 is provided with a smooth axial bore 18 whose diameter is determined in accordance with the steam pressure for which the valve is designed. The bore 18 of the bushing may be cylindrical as here shown, or tapering or of other suitable shape as desired, but it is important that the bushing comprise a substantially uninterrupted columnar portion 19 surrounding the bore 18 and capable of withstanding the longitudinal stress imposed by the valve spring without substantial axial compression. At the point 20 the exterior surface of the bushing or sleeve 13 is screw threaded for engagement with the screw threads at 9 upon the inner surface of the casing. Preferably the bushing is furnished with a radial flange 21 adapted to seat within the rabbet 10 and to engage the surface 11 with a substantially fluid tight fit. The bushing is also provided with a second radial flange 22 which engages the lower surface of the attaching flange 4 and which preferably fits snugly within but projects slightly below the annular rib or flange 12 upon the lower surface of the flange 4. As thus arranged the flange 22 is clamped firmly against the under surface of the flange 4 by the action of the bolts or rivets which secure the flange 4 to the pressure receptacle, and this action is assisted by the steam pressure, upon the lower end of the bushing thus substantially preventing leakage of steam past the bushing and relieving the screw threads so that they are not called upon to withstand any substantial stress.

All of that portion of the bushing which is above the screw threads 20 is free from contact with the casing, and at this part of the bushing its outer surface is provided with one or more outstanding circumferential ribs 24 and with one or more grooves 23, the grooves and ribs alternating with each other. These ribs and grooves provide a convenient means of imparting to the bushing those desirable characteristics which are clearly pointed out in the above noted patent to Blanchard and Crocker, since with this arrangement the bushing comprises one or more relatively weak or yielding sections and one or more reinforced and relatively stiff and unyielding sections so that ordinary distortions in the casing are absorbed by the bushing and not transmitted to the valve seat. While the above mode of producing these alternating weakened and reinforced sections is desirable and relatively simple we contemplate that similar results might possibly be obtained in other ways and we do not wish in all cases to limit our present invention to this specific mode of accomplishing the result, it being sufficient that the bushing be of such character that ordinary distortions of the casing will not be transmitted to the valve seat through the bushing.

By connecting the bushing to the casing at a point very close to the attaching flange 4 and preferably within the thickness of the latter, it is possible for the bushing, provided with the compensating features described, to take care of all such slight disturbing forces as may be transmitted through its connection to the casing, and thus to maintain the valve seat true under the most extreme conditions of temperature and pressure.

In the modified arrangement shown in Fig. 2 the valve casing body 1ª is provided with the chamber 2ª for the reception of the valve and with a hollow stem 3ª connecting it to the attaching flange 4ª. The stem 3ª is provided with a bore or chamber 5ª but this chamber is preferably reduced in diameter where it enters the thickness of the flange 4ª and this reduced portion is internally screw threaded as indicated at 9ª. Preferably the bore is further reduced below this threaded part, as indicated at 25, although this is not necessary.

The seat bushing 13ª is externally screw threaded at its lower end for engagement with the threaded portion 9ª of the casing and is provided at its upper end with the valve surface 14ª for engagement with the usual valve 7ª. The bushing 13ª is provided with the external ribs 24ª and grooves 23ª as fully described in the patent to Blanchard and Crocker above referred to, such ribs and grooves having the functions fully described in said patent. In this modified arrangement it is possible to remove the seat bushing upwardly through the valve casing without removing the latter from the fluid container but in this instance the screw threads connecting the bushing and casing must bear the entire stress of the fluid pressure acting upon the lower end of the bushing.

In both of the arrangements described the bushing is disposed almost wholly within the lower part of the casing, that is to say within the neck and attaching flange so that the valve seat surface is substantially in the plane of the junction of the neck portion of the casing with the body portion of the latter. The seat surface of the bushing is, in both of the instances described, quite low as compared with the arrangement shown in the patented construction, thus making it possible to reduce the vertical dimensions of the valve structure, which is desirable, and at the same time reducing the vertical distance between the outlet of the valve casing and the attaching flange.

As the outlet of the casing is obliged to support the weight of the delivery pipe and since such weight may be quite considerable it is advantageous to have the point of connection of the pipe as close to the plane of the attaching flange as possible in order to reduce the moment arm through which the weight of the pipe acts, thereby reducing the tendency to bend or deflect the valve casing.

In the arrangement herein disclosed the outlet pipe is disposed very close to the attaching flange and thus in this way distortions of the casing are minimized. The several features of construction above enumerated thus all contribute towards maintenance of the valve seat true and in proper position to cooperate with the valve.

In Fig. 3 we have illustrated a set of standardized valves indicated at $V^1$, $V^2$, $V^3$ and $V^4$ each valve being designed to discharge the same quantity of pressure fluid per unit of time. These valves are all of substantially identical external shape and dimensions and each valve of the series is provided with a bore B of substantially the same diameter. We also provide a set of valve seat bushings 26, 27, 28 and 29, all of the same external diameter and each provided with means, for example screw threads, for attaching it in position within the bore B in any one of the valve casings. While these bushings are of the same external diameter they are furnished respectively with internal bores $b^1$, $b^2$, $b^3$, $b^4$, etc. of different diameters; for example, as here shown the bore $b^1$ of the bushing 26 is of the smallest diameter and is adapted to discharge steam or other fluid under high pressure, for example, through a range of pressures from 900 to 1500 pounds to the square inch. The bore $b^2$ in the bushing 27 is of somewhat larger diameter than the bore $b^1$ just described and may, for example, be adapted to discharge pressure fluid through a pressure range varying from 400 to 900 pounds; likewise the bores $b^3$ and $b^4$ are adapted to deliver steam or other pressure fluid under pressures extending through ranges of from 200 to 400 pounds and from zero to 200 pounds respectively. Since the several bushings 26, 27, etc. are interchangeable and may be installed in any one of the casings, it is evident that any casing of the series may be adapted to handle pressure fluid of a given range without necessitating any change in the size or structural features of the casing.

Since the arrangement in Figs. 1 and 2 compensates very completely for any distortions of the casings due to temperature or pressure changes, it is evident that this arrangement is particularly well adapted for use in such a series of standardized valves, since there is no danger in adapting any given valve casing to handle pressure fluid of a given range, by installing therein the proper valve seat bushing, that the seat bushings will fail to maintain a true seat surface under any of the conditions to which it may be subjected in use.

While four such standard valves have been indicated as comprising a set, it is of course to be understood that this is merely illustrative and that such a set of valves may comprise any number whatsoever within the range of practical utility.

While we have shown our invention embodied in a specific structural arrangement, we wish it to be understood that we are not to be limited in this respect, but that changes in dimensions, relative arrangement of parts and materials may be made without departing from the spirit of the invention.

We claim:

1. A valve of the class described comprising a casing provided with an attaching flange, the casing having a bore or chamber coaxial with said flange, a valve seat bushing disposed within said chamber, one end of the bushing carrying a valve seat and the opposite end of the bushing engaging the casing at a point substantially in the plane of said flange, the bushing comprising an annular column adapted to withstand longitudinal compressive stresses and having alternate yielding and unyielding sections adapted to prevent transmission of distortions of the valve body to the valve seat.

2. A valve of the class described comprising a casing and a valve therein, said casing having an attaching member at its base, a valve seat bushing having a valve seat at its upper end, said bushing engaging the casing at the plane of said attaching member, the upper portion of the bushing being spaced from the casing wall, said bushing being substantially unyielding to valve pressure and having alternating circumferential external ribs and grooves.

3. A valve of the class described comprising a casing provided with an attaching flange, the casing having a chamber concentric with said flange, a valve seat bushing disposed within said chamber, one end of the bushing carrying a valve seat and the opposite end of the bushing having screw threaded engagement with the casing substantially in the plane of the attaching flange, the bushing having an axial bore and having a circumferential rib and groove on its outer surface intermediate the valve seat and its point of attachment to the casing, said rib being spaced from the wall of the casing.

4. A valve of the class described comprising a casing having an inlet bore provided with an annular rabbet adjacent to its inlet end, a valve seat bushing disposed within said bore, said bushing having a flange engaging said rabbet, the bushing having a valve seat at its inner end, the bushing also having a substantially smooth bore and a circumferential rib upon its outer surface intermediate its ends, said rib being spaced from the wall of the casing.

5. A valve of the class described comprising a casing having an inlet bore and a valve seat bushing disposed within said bore, said bushing having a flange engaging an under surface of the casing whereby clamping pressure applied to the casing for attaching it to a fluid container will press said flange into tight contact with the casing, the bushing carrying a valve seat at its inner end, said bushing having an axial bore and alternating ribs and grooves upon its outer surface intermediate the valve seat and said flange.

6. A valve of the class described comprising a casing having an inlet bore provided with an annular rabbet adjacent to its inlet end, a valve seat bushing disposed within said bore, said bushing having a flange engaging said rabbet, screw threads on the bushing engaging an internally screw threaded portion of the wall of the inlet bore, and a valve seat at the inner end of the bushing, the bushing having a substantially smooth axial bore and a circumferential rib and groove upon its outer surface intermediate its ends, the rib being free from contact with the wall of the inlet bore.

7. A valve of the class described, comprising a casing provided with a body having a supporting stem of relatively smaller diameter than the casing, said stem having a chamber therein, a seat bushing disposed in said chamber, said bushing having a valve seat at its upper end, said seat being adjacent to the junction of the body and stem of the casing, attaching means at the lower end of the stem and means connecting the bushing to the casing substantially in the plane of the attaching means, said bushing being substantially unyielding to longitudinal pressure and comprising relatively yielding and unyielding or reinforced sections adapted to prevent distortions of the valve body from being transmitted to the valve seat.

8. A valve of the class described comprising a casing having a hollow body and an attaching flange, the casing having an inlet bore extending from the lower side of the flange to the interior of the body, a valve seat bushing housed within said inlet bore, said bushing having a substantially smooth axial passage and having circumferential portions of relatively greater and smaller cross sectional area, said bushing having a valve seat at one end adjacent to the junction of the inlet bore with the hollow in the body of the casing, the bushing also having a flange engaging a rabbet in the wall of the inlet bore and having a second flange engaging the under surface of the attaching flange of the casing.

9. A standard safety valve adapted to deliver a uniform quantity of fluid per hour independent of the pressure range of such fluid, said valve comprising a casing having inlet and outlet bores of fixed and predetermined size, an attaching flange at the base of the casing, interchangeable valve seat bushings having substantially smooth axial bores of different diameters respectively, each bushing having an annular valve seat at its upper end, each bushing having circumferential portions of relatively greater and smaller cross sectional area, the lower ends of the several bushings being of substantially the same outside diameter, and complemental engaging elements in the plane of the attaching flange of the casing and upon each bushing, respectively, for interchangeably securing any selected bushing within the inlet bore of the casing with the valve seat of the bushing spaced from the walls of the casing.

Signed by us at Bridgeport, Connecticut, this 5th day of April, 1927.

CARL H. GRAESSER.
ERNEST B. CROCKER.